March 7, 1944.   H. D. PORTER ET AL   2,343,702
ACYLIMINO PYRAZOLONE COUPLERS
Filed Sept. 25, 1941
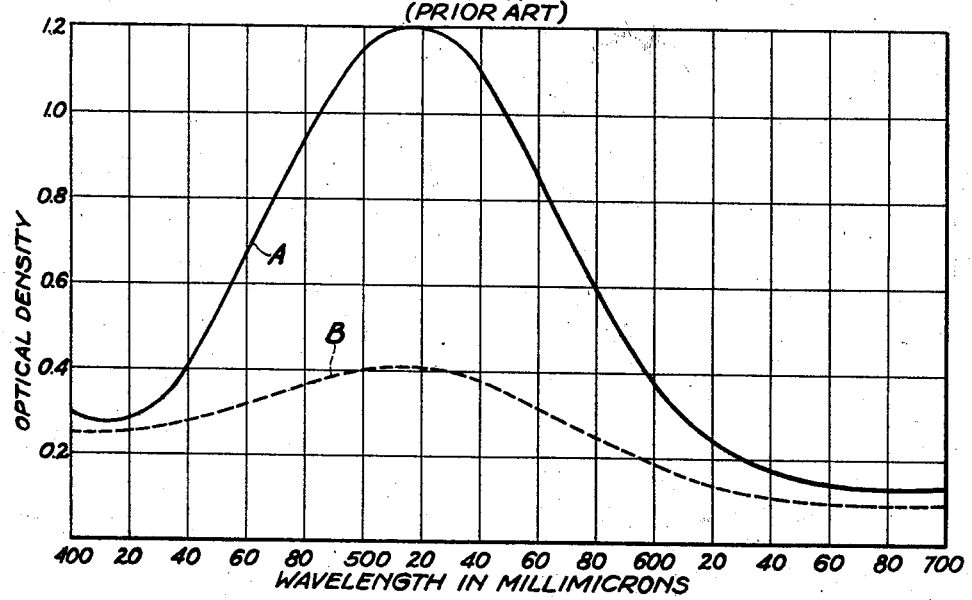
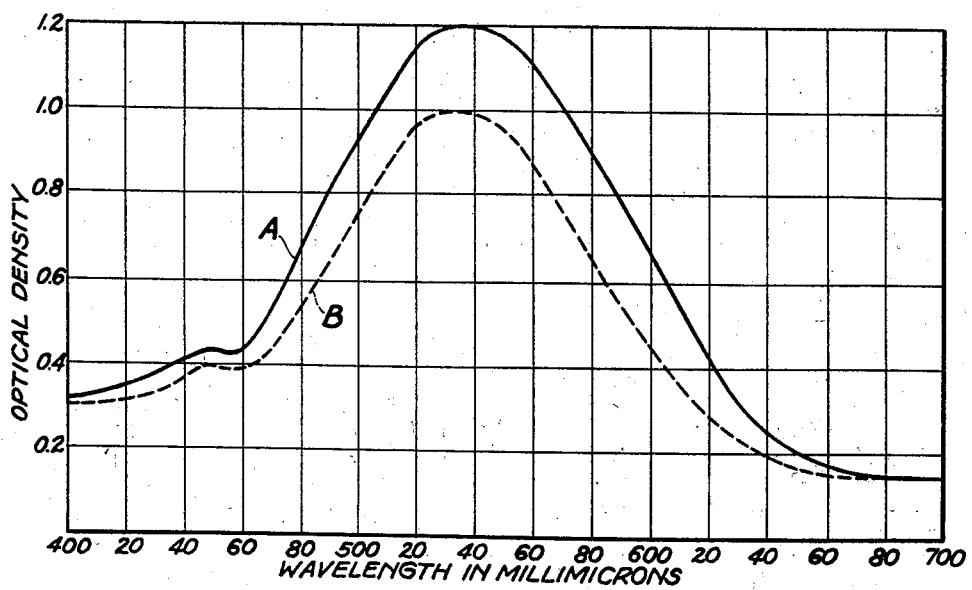
HENRY D. PORTER
ARNOLD WEISSBERGER
INVENTORS
BY R. Frank Smith
ATTORNEYS Patented Mar. 7, 1944

2,343,702

UNITED STATES PATENT OFFICE 2,343,702

ACYLIMINO PYRAZOLONE COUPLER

Henry D. Porter and Arnold Weissberger, Rochester, N. Y., assignors to Eastman Kodak Company, Rochester, N. Y., a corporation of New Jersey Application September 25, 1941, Serial No. 412,244
In Great Britain November 4, 1940

15 Claims. (Cl. 95—6)

This invention relates to photographic color forming compounds and particularly to color forming coupler compounds comprising acyl-substituted imino pyrazolones.

The formation of colored photographic images by coupling the development product of aromatic amino developing agents with color forming or coupling compounds is well known. In these processes the subtractive process of color formation is ordinarily used and the image dyes are intended to be of the complementary primary colors cyan or blue-green, magenta, and yellow. The couplers which produce the cyan dyes are usually phenols or naphthols, those producing the magenta dyes are ordinarily pyrazolones or cyano acetyl compounds, and those producing the yellow dyes are ordinarily compounds containing a methylene group having two carbonyl groups attached to it. The dyes produced by coupling are azomethines, indamines or indophenols depending upon the composition of the coupler and of the developer.

The principal disadvantages which have been encountered in the use of dyes of this type are undesirable light transmission characteristics and unstability of the dyes to heat and light. The most desirable dyes would be those which transmit two of the primary colors completely and absorb the third primary color completely. For example, the magenta dye should absorb green light completely and transmit blue and red light completely. It should retain these transmission characteristics over a long period of time and should withstand reasonable exposures to heat and light without appreciable fading or loss of its light transmission characteristics. Many of the available couplers, however, have not produced dyes having these desirable characteristics.

It is, therefore, an object of the present invention to provide novel photographic coupler compounds producing dyes which have desirable properties with respect to heat and light stability. A further object is to provide novel couplers capable of producing magenta dye images in photographic emulsion layers. A still further object is to provide novel couplers capable of producing magenta dyes in photographic layers having the desired light transmission characteristics for color photography. A still further object is to provide couplers capable of incorporation in photographic emulsion layers. Other objects will appear from the following description of our invention.

These objects are accomplished by the use, as coupler compounds, of acylimino pyrazolones, especially those having a hydroxyl group in the 3-position and a phenyl group in the 1-position where the imino group is in the 5-position.

In the accompanying drawing, Fig. 1 is a graph showing the effect of heat and light on a dye produced from a prior art coupler and Fig. 2 is a graph showing the effect of heat and light on a dye produced from a coupler of the present invention.

The couplers which we propose to use have the following general formula:

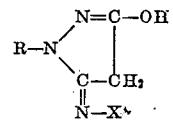

in which

R = a substituted or unsubstituted aryl group
X = an acyl group.

Compounds representing this general class are as follows:

(1) 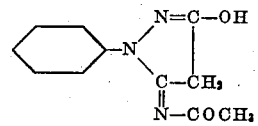

1-phenyl-3-hydroxy-5-acetylimino-pyrazolone (2) 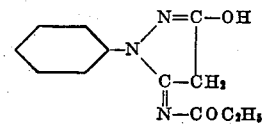

1-phenyl-3-hydroxy-5-propionyl-iminopyrazolone (3) 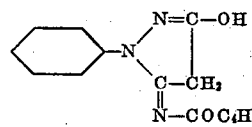

1-phenyl-3-hydroxy-5-n-valeryl-iminopyrazolone (4) 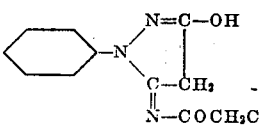

1-phenyl-3-hydroxy-5-chloro-acetyliminopyrazolone (5) 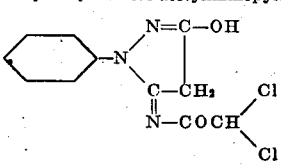

1-phenyl-3-hydroxy-5-dichloro-acetyliminopyrazolone (6) 1-phenyl-3-hydroxy-5-benzoyl-iminopyrazolone (7) 1-phenyl-3-hydroxy-5-(m-amino-benzoyl)iminopyrazolone hydrochloride (8) 1-phenyl-3-hydroxy-5-(p-sec. amylbenzoylimino)pyrazolone (9) 1-phenyl-3-hydroxy-5-(diamyl-benzoyl)iminopyrazolone

(10) 1-phenyl-3-hydroxy-5-β-naphthoyl-iminopyrazolone

(11) 1-phenyl-3-hydroxy-5-phenyl-carbamyliminopyrazolone

(12) 1-phenyl-3-hydroxy-5-α-naphthyl-carbamyliminopyrazolone

(13) 1-phenyl-3-hydroxy-5-phenyl-acetyliminopyrazolone

(14) 1-phenyl-3-hydroxy-5-phenoxy-acetyliminopyrazolone

(15) 1-phenyl-3-hydroxy-5-p-nitro-benzoyliminopyrazolone

(16) 1-phenyl-3-hydroxy-5-p-amino-benzoyliminopyrazolone

(17) 1-phenyl-3-hydroxy-5-m-nitro-benzoyliminopyrazolone

(18) 1-phenyl-3-hydroxy-5-(o-carboxy-benzoyl)-iminopyrazolone

(19) 1-phenyl-3-hydroxy-5-(o-carbamylbenzoyl)-iminopyrazolone

(20) 1-phenyl-3-hydroxy-5-(p-hydroxy-benzoyl)-iminopyrazolone

(21) 1-phenyl-3-hydroxy-5-(p-sulfamylbenzoyl)-iminopyrazolone

(22) 1-phenyl-3-hydroxy-5-palmityl-iminopyrazolone

(23) 1-phenyl-3-hydroxy-5-(ω-carboxy-n-valeryl)iminopyrazolone

(24) 1-phenyl-3-hydroxy-5-[β(p-isopropylphenyl)-propionylimino]-pyrazolone

(25) 1-phenyl-3-hydroxy-5-benzenesulfonyliminopyrazolone

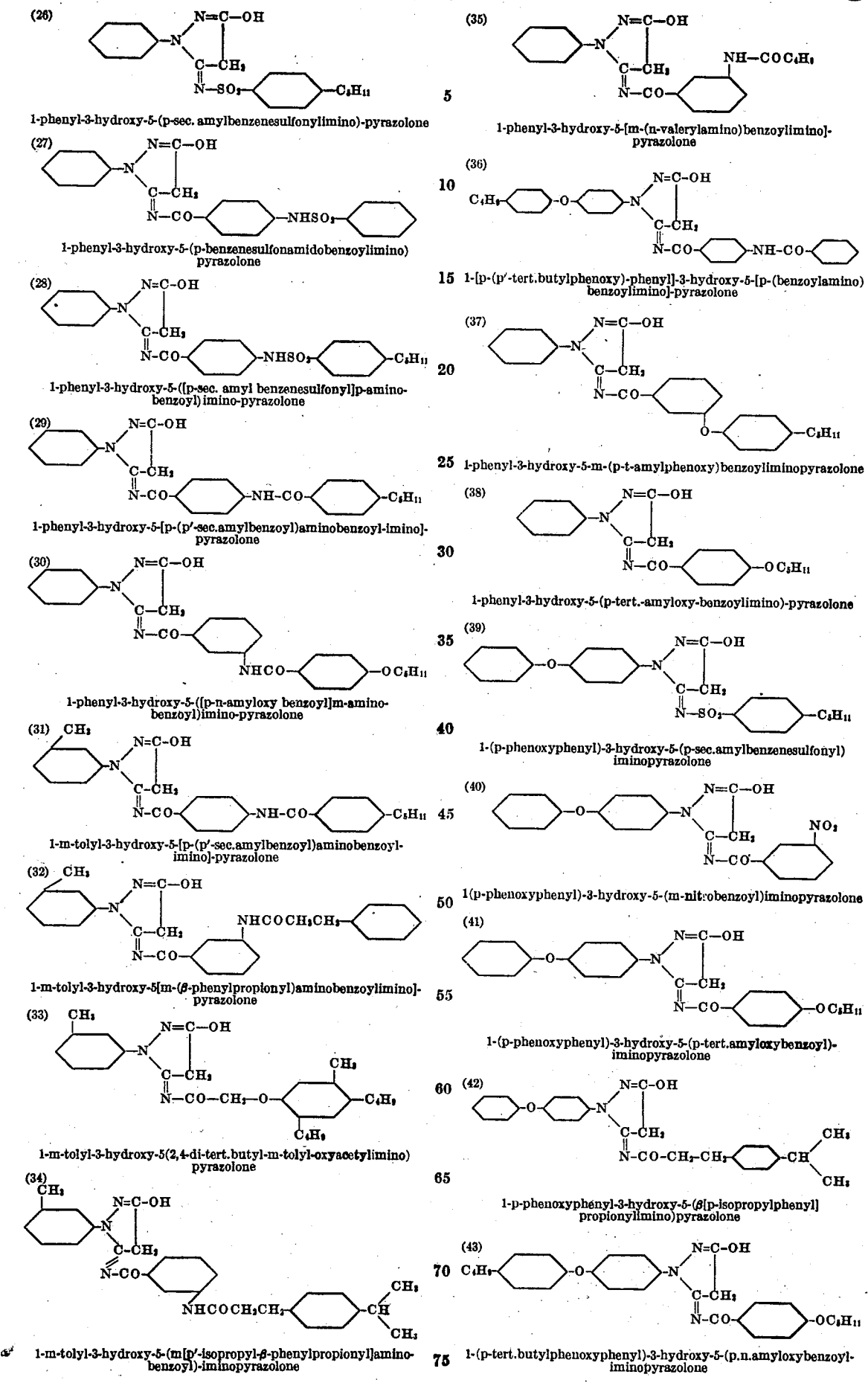

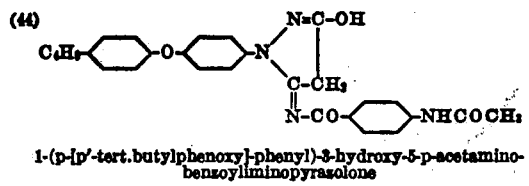

1-(p-[p'-tert.butylphenoxy]-phenyl)-3-hydroxy-5-p-acetamino-benzoyliminopyrazolone

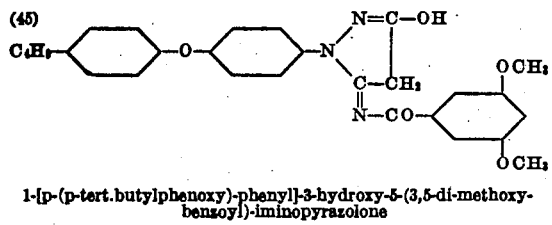

1-[p-(p-tert.butylphenoxy)-phenyl]-3-hydroxy-5-(3,5-di-methoxybenzoyl)-iminopyrazolone

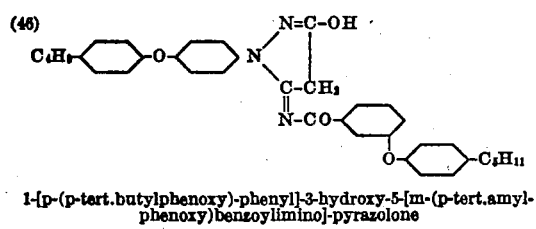

1-[p-(p-tert.butylphenoxy)-phenyl]-3-hydroxy-5-[m-(p-tert.amylphenoxy)benzoylimino]-pyrazolone

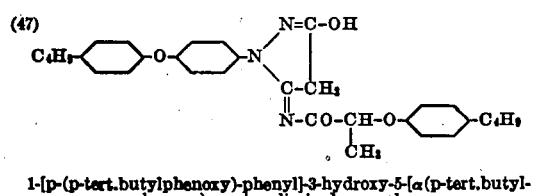

1-[p-(p-tert.butylphenoxy)-phenyl]-3-hydroxy-5-[α-(p-tert.butylphenoxy)propionylimino]-pyrazolone

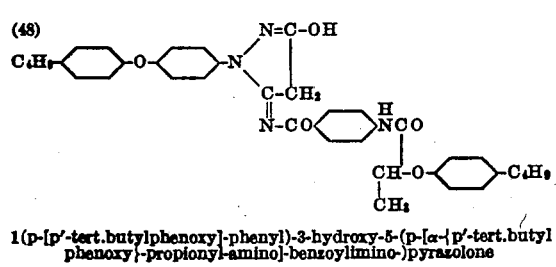

1(p-[p'-tert.butylphenoxy]-phenyl)-3-hydroxy-5-(p-[α-{p'-tert.butylphenoxy}-propionyl-amino]-benzoylimino-)pyrazolone

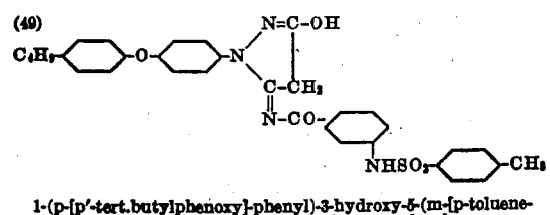

1-(p-[p'-tert.butylphenoxy]-phenyl)-3-hydroxy-5-(m-[p-toluene-sulfonylamino]-benzoyliminopyrazolone)

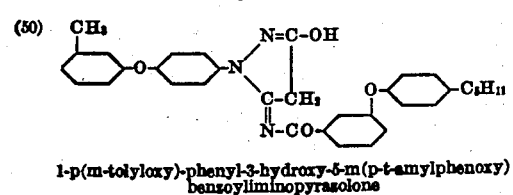

1-p-(m-tolyloxy)-phenyl-3-hydroxy-5-m(p-t-amylphenoxy)benzoyliminopyrazolone

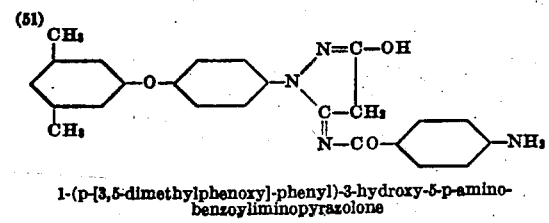

1-(p-[3,5-dimethylphenoxy]-phenyl)-3-hydroxy-5-p-aminobenzoyliminopyrazolone

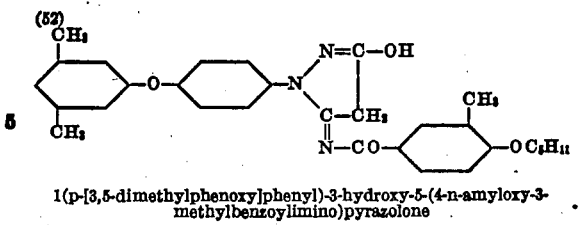

1(p-[3,5-dimethylphenoxy]phenyl)-3-hydroxy-5-(4-n-amyloxy-3-methylbenzoylimino)pyrazolone The novel couplers of our invention are produced by replacement of the hydrogen on the imino group of 3-hydroxy-5-iminopyrazolone by an acyl group. The acylations are carried out by heating the iminopyrazolone with the respective acid chloride or anhydride, with or without solvent and with or without condensation agents, employing temperatures ranging from 100–160° C. The 5-(aminobenzoylimino) derivatives are prepared by reduction of the corresponding nitro derivatives. These amino derivatives were acylated in acetic acid using sodium acetate as the condensing agent, but other methods are likewise feasible. The acyl group may vary in its composition and may be derived from either an aliphatic (open chain or cyclic), an aromatic, or a heterocyclic acid. It may be substituted to vary the properties of the coupler and of the resulting dye as will be pointed out more fully hereinafter.

Our couplers are designed for use in processes in which the coupler is incorporated in the developing solution such as those described in Mannes and Godowsky U. S. Patent 2,113,329, granted April 5, 1938, or Mannes, Godowsky and Wilder U. S. Patent No. 2,252,718, granted August 19, 1941. Certain of the couplers of our invention may be incorporated in sensitive emulsion layers for use in processes such as those described in Fischer U. S. Patent 1,055,155, Mannes and Godowsky U. S. Patents 2,304,939 and 2,304,940, granted December 15, 1942, and Jelley and Vittum U. S. Patent 2,322,027, granted June 15, 1943.

The following examples illustrate developing solutions containing the couplers used according to our invention:

*Example 1*

A. 2-amino-5-diethylamino toluene hydrochloride _____grams__ 2
   Sodium sulfite (anhydrous) _____do____ 2
   Sodium carbonate (anhydrous) __do____ 20
   Potassium bromide _____do____ 1
   Water to_____cc__ 1000

B. 1-phenyl-3-hydroxy-5-acetylimino pyrazolone _____grams__ 2
   Sodium hydroxide (10% solution) __cc__ 10

B is added to A

*Example 2*

A. 2-amino-5-diethylamino toluene sulfate _____grams__ 2.5
   Sodium sulfate (anhydrous) ___do____ 5
   Sodium carbonate (anhydrous) _do____ 20
   Potassium bromide_____do____ 2
   Water to _____cc__ 1000

B. 1 - phenyl - 3 -hydroxy-5-benzoylimino pyrazolone _____grams__ 3
   Isopropyl alcohol_____cc__ 100

B is added to A

The foregoing examples refer to the addition of the coupler compound to the developing solution itself. The coupler may also be added to the emulsion layer provided that suitable means are used to prevent its diffusion in the case of multilayer coatings. Special dispersing agents may be used for incorporating the coupler compound in the emulsion and in certain cases the coupler may be absorbed or adsorbed to the sensitive salt or may be combined with the sensitive salt as a chemical combination. Certain of the coupler compounds described in the present application such as Nos. 22, 29, 31, 34, 36, 41, 43, 45, 46, 47, 48, 50, and 52 are in themselves non-diffusing and may be incorporated in the photographic layer without the use of additional agents to prevent diffusion. These couplers may also be incorporated in an emulsion layer according to the methods of Mannes and Godowsky U. S. Patent 2,304,940 and Jelley and Vittum U. S. 2,322,027 referred to above.

As stated above, some of the couplers described in the present application are of value in the process of Jelley and Vittum U. S. 2,322,027. In the process of that application the coupler is first dissolved in a water-insoluble high boiling organic crystalloidal material such as 1,2-dimethoxybenzene or dimethylphthalate, and the solution is then dispersed in the sensitive emulsion. One of the requirements of this process is that the coupler should have a high solubility in the coupler solvent or crystalloidal material so that a minimum amount of crystalloidal material is necessary. If only a dilute solution of the coupler can be used, a large volume of the coupler solution is needed to supply the required amount of coupler in the layer with the result that the coated emulsion layers are too thick. It has been found that the couplers having an ether group such as Nos. 33, 36, 38, 39, 41, 43 to 48, 50 and 52 have improved solubility in the coupler solvents ordinarily used in the process of the Jelley and Vittum Patent 2,322,027 and, therefore, are especially useful in that process.

One of the advantages of the couplers used according to our invention is that the dyes formed from them have greater stability to heat and light than those from couplers previously used. In the accompanying drawing a comparison is shown between a typical prior art coupler and a coupler of the present invention to indicate the improvement brought about by the couplers of the present invention. The coupler β-naphthoylacetonitrile is a typical prior art coupler which produces a magenta dye having desirable light absorption characteristics for purposes of color photography. It is described in British Patent 478,942. As shown in Fig. 1 of the drawing, this coupler, when used in a developing solution similar to that of Example 1 of the present application, produces a dye having the absorption characteristics of the curve A. After exposure of this dye for six hours on the Fade-O-Meter to high intensity visible and ultra-violet light, the dye had the absorption indicated by the curve B. Fig. 2 illustrates the dye obtained from the coupler 1-phenyl-3-hydroxy-5-benzoylimino pyrazolone using the developer formula of Example 2 of the present application. This dye had the absorption characteristics indicated by the curve A and, after exposure for six hours on the Fade-O-Meter under conditions identical with those used in the exposure of the dyes of Fig. 1, the dye had the absorption indicated by B. The amount of fading or loss in absorption characteristics of the dye produced from the acylimino pyrazolone was, therefore, much less than the fading produced in the case of the prior art compound.

We are aware that 1-phenyl-3-hydroxy-5- imino pyrazolone has been described in British Patent 478,990 as a coupler. The acyl-substituted imino pyrazolones, however, are superior in light absorption characteristics to the unsubstituted imino pyrazolone. The acylimino pyrazolones of our invention have greater blue light transmission and sharper absorption curves than the unsubstituted imino pyrazolone. Our novel compounds, therefore, possess the combined characteristics of high fastness to heat and light and desirable absorption characteristics for use in processes of multi-color photography.

In the development of exposed photographic silver halide emulsion layers, using the couplers of our invention, any color forming developer containing a primary amino group may be used. These include developers having two primary amino groups as well as those having one of the amino groups substituted or having substituents in the ring such as alkyl phenylenediamines. These compounds are usually used in the salt form such as the hydrochloride or the sulfate which are more stable than the amines themselves. The suitable compounds are diethyl-p-phenylenediamine hydrochloride, monomethyl-p-phenylenediamine hydrochloride, dimethyl-p-phenylenediamine hydrochloride and 2-amino-5-diethyl-aminotoluene hydrochloride. The p-amino phenols and their substitution products may also be used where the amino group is unsubstituted. All of these developers have an unsubstituted amino group which enables the oxidation products of the developer to couple with the color forming compounds to form a dye image.

Our development process may be employed for the production of colored photographic images in layers of gelatin or other carriers, such as collodion, organic esters of cellulose, or synthetic resins. The carrier may be supported by a transparent medium such as glass, a cellulose ester or a non-transparent reflecting medium such as paper or an opaque cellulose ester. The emulsion may be coated as a single layer on the support or as superposed layers on one or both sides of the support. The superposed layers may be differentially sensitized and the dyes formed therein by coupling may be bleached by an oxidizing agent such as chromic acid to colorless soluble compounds. The destruction of the dye in this way does not destroy the silver image and a silver image may be developed, bleached and developed to color images in superposed layers as described, for example, in Mannes and Godowsky U. S. Patent No. 2,113,329.

The examples and compounds set forth in the present specification are illustrative only and it is to be understood that our invention is to be taken as limited only by the scope of the appended claims.

We claim:

1. A color forming photographic developer comprising a primary aromatic amino developing agent and a coupler compound having the formula:

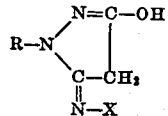

in which R is an aryl group and X is an acyl group.

2. A color forming photographic developer comprising a primary aromatic amino developing agent and a coupler compound having the formula:

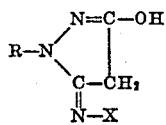

in which R is an aryl group and X is an acyl group derived from an aliphatic acid.

3. A color forming photographic developer comprising a primary aromatic amino developing agent and a coupler compound having the formula:

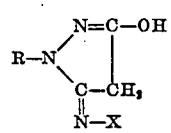

in which R is an aryl group and X is an acyl group derived from an aromatic acid.

4. A color forming photographic developer comprising a primary aromatic amino developing agent and a coupler compound having the formula:

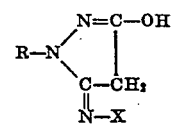

in which R is an aryl group and X is an acyl group derived from a benzoic acid.

5. A color forming photographic developer comprising a primary aromatic amino developing agent and a coupler compound having the formula:

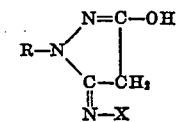

in which R is a phenyl radical and X is a benzoyl radical.

6. The method of producing a magenta colored photographic image in a gelatino silver halide emulsion layer which comprises exposing the layer and developing it with a primary aromatic amino developing agent in the presence of a coupler compound having the formula:

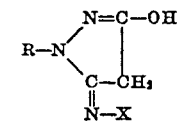

in which R is an aryl group and X is an acyl group.

7. The method of producing a magenta colored photographic image in a gelatino silver halide emulsion layer which comprises exposing the layer and developing it with a primary aromatic amino developing agent in the presence of a coupler compound having the formula:

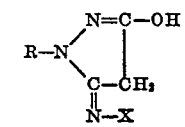

in which R is an aryl group and X is an acyl group derived from an aliphatic acid.

8. The method of producing a magenta colored photographic image in a gelatino silver halide emulsion layer which comprises exposing the layer and developing it with a primary aromatic amino developing agent in the presence of a coupler compound having the formula:

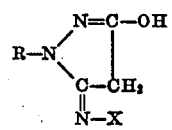

in which R is an aryl group and X is an acyl group derived from an aromatic acid.

9. The method of producing a magenta colored photographic image in a gelatino silver halide emulsion layer which comprises exposing the layer and developing it with a primary aromatic amino developing agent in the presence of a coupler compound having the formula:

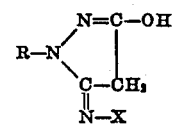

in which R is a phenyl radical and X is a benzoyl radical.

10. A photographic emulsion for forming colored images comprising a carrier containing a sensitive silver halide and a coupler compound having the formula:

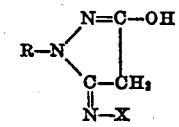

in which R is an aryl group and X is an acyl group.

11. A photographic emulsion for forming colored images comprising a carrier containing a sensitive silver halide and a coupler compound having the formula:

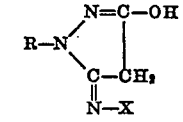

in which R is a phenyl radical and X is a benzoyl radical.

12. A photographic emulsion for forming colored images comprising a carrier containing a sensitive silver halide and a coupler compound having the formula:

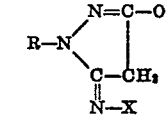

in which R is an aryl radical and X is a benzoyl radical and at least one of the substituents R and X contains an ether linkage.

13. A photographic emulsion for forming colored images comprising a carrier containing a sensitive silver halide and a coupler compound having the formula:

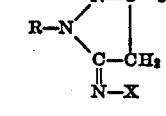

in which R is a phenoxy phenyl group and X is a benzoyl group.

14. A photographic emulsion for forming colored images comprising a carrier containing a sensitive silver halide and a coupler compound having the formula:

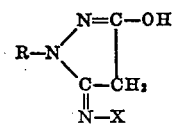

in which R is a phenoxy phenyl group and X is a benzoyl radical containing an ether linkage.

15. A photographic emulsion for forming colored images comprising a carrier containing a sensitive silver halide and a coupler compound having the formula:

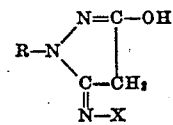

in which R is a p-tertiary butyl phenoxy phenyl group and X is a benzoyl radical containing an ether linkage.

HENRY D. PORTER.
ARNOLD WEISSBERGER.

CERTIFICATE OF CORRECTION.

Patent No. 2,343,702. March 7, 1944.

HENRY D. PORTER, ET AL.

It is hereby certified that error appears in the printed specification of the above numbered patent requiring correction as follows: Page 4, second column, line 62, Example 2, for "sulfate" read --sulfite--; and that the said Letters Patent should be read with this correction therein that the same may conform to the record of the case in the Patent Office.

Signed and sealed this 30th day of May, A. D. 1944.

Leslie Frazer

(Seal) Acting Commissioner of Patents.